2,722,268
SEAT CUSHION

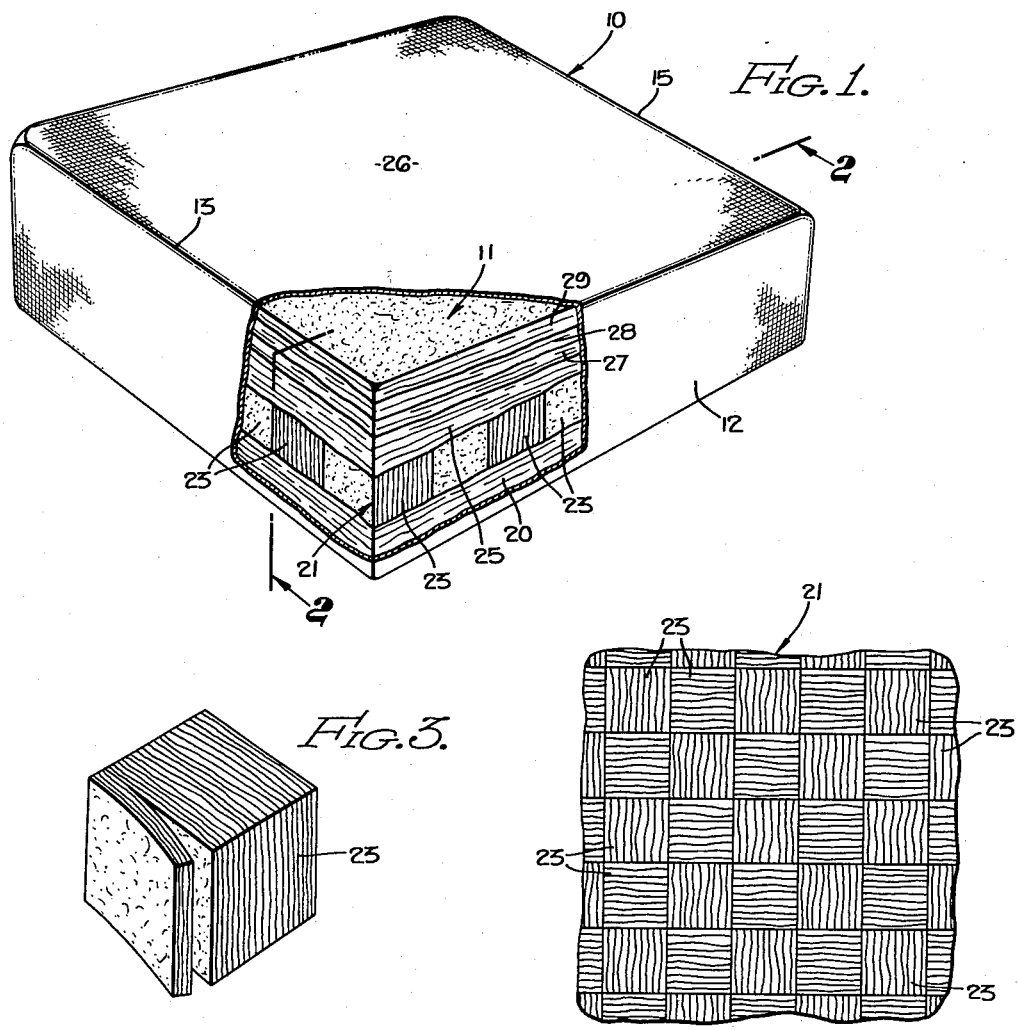
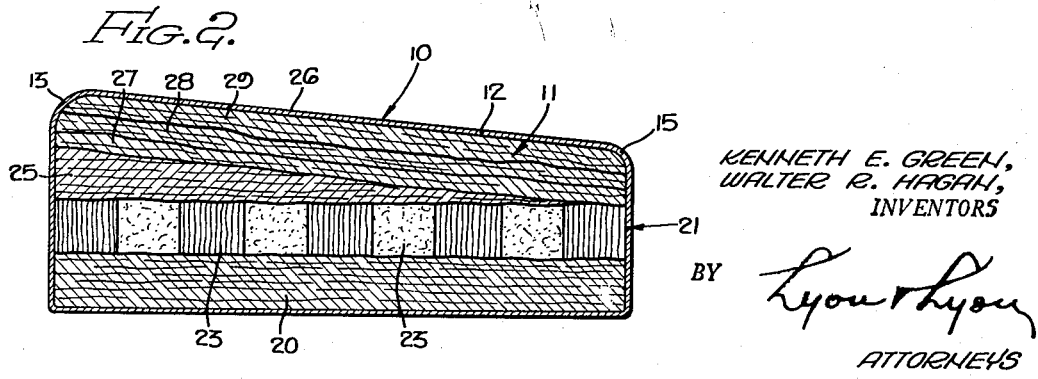

Kenneth E. Green and Walter R. Hagan, Santa Ana, Calif.

Application February 23, 1954, Serial No. 411,738

4 Claims. (Cl. 155—179)

Our invention relates to the construction of seat cushions and has particular reference to seat cushions primarily adapted for use in aircraft.

In the design of aircraft seat cushions the weight factor is a primary consideration, along with the factors of comfort and reduction or elimination of fatigue on the part of the occupant. Recent advances in the art have led to the use of glass fiber batting, a material which is of low density, and fire, mildew and odor resistant. Possibly the most comfortable aircraft seat cushion heretofore proposed is formed of horizontal layers or laminae of the glass fiber, but this construction is highly disadvantageous from the standpoint that after only a few thousand cycles of use the laminae become closely packed together, reducing the cushion thickness and available resiliency. Other efforts include positioning the laminae in vertical planes, i. e., in planes parallel to the direction of the design load of the cushion. This type of cushion sacrifices some of the comfort of the horizontally laminated construction, but obtains somewhat improved fatigue resistant qualities. However, even this type is subject to permanent deformation from repeated use, due to undulation or "serpentining" of the individual laminae. One of the principal objects of this invention is, therefore, to provide a seat cushion which embodies the advantages of those heretofore proposed, but which is not subject to the disadvantages thereof.

Another object of this invention is to provide a seat cushion which is very light in weight and extremely comfortable in use, yet which is highly fatigue resistant and not subject to permanent deformation or "set" under repeated and static normal deflection loads.

Still another object of this invention is to provide a light-weight seat cushion of glass fiber construction, the cushion including at least one set of laminae disposed in planes normal to the direction of the design load and a plurality of laminae of columnar form disposed in planes parallel to the direction of the design load.

Another object of this invention is to provide a seat cushion of the type described, which is adapted to be produced economically on a quantity basis.

Other objects and advantages of this invention, it is believed, will be readily apparent from the following detailed description of a preferred embodiment thereof when read in connection with the accompanying drawings.

In the drawings:

Figure 1 is a perspective view, partly in section, of a seat bottom cushion embodying the invention.

Figure 2 is a sectional elevation taken substantially on the line 2—2 of Figure 1.

Figure 3 is a perspective view of a single columnar element.

Figure 4 is a top plan view of the columnar filler portion of the invention.

Referring now to the drawings, the invention is illustrated as embodied in a seat bottom cushion 10 especially designed for use in passenger aircraft. The present invention is equally applicable to backs and arm rests of seats as well as to seat bottom cushions, but its advantages are particularly evident in the latter, and for this reason it is described and illustrated in that connection. It is to be understood, however, that this is not considered as a limitation, and that the word "cushion" or similar expressions used herein is to be construed as referring to any upholstered portion of a seat subjected to loads imposed by the seat's occupant. Similarly, while the cushions of this invention are especially suitable for aircraft use, it is obvious that they are useful in other environments as well.

The cushion 10 comprises a filler 11 and an outer wrapper 12 of suitable fabric. The cushion may be of any desired shape, but is shown generally rectangular in plan and is designed to be supported on a seat structure (not shown) to provide a comfortable rest for those portions of the occupant for which it is designed. The form shown has a greater height or thickness at its forward edge 13 in order to support the underside of the occupant's knees, and is inclined downwardly to the rear edge 15 to conform to standards of seat comfort well known in the art.

The filler 11 includes a lowermost set or batt 20 of glass fiber laminae disposed in planes substantially normal to the direction of the design load. Glass fiber is presently available in the form of woven cloth or as batt. In the latter form, which is used in the cushions of this invention, the direction of the fibers is generally in the plane of the batt but the fibers are not otherwise controlled in relation to one another. It has been found desirable in the present invention to utilize glass fiber batt having densities ranging from 2 pounds per cu. ft. to ¾ pound per cu. ft. The material comprises fibers of approximately 9 microns in diameter which are lightly bonded together with a thin coat of thermosetting resin.

Positioned above the batt 20 is a set 21 of glass fibre laminae, this latter set being of columnar construction. That is, the set 21 comprises a plurality of column members 23, the laminae therein all being disposed in planes substantially parallel to the direction of the design load. Preferably, as shown in the drawings, the column members 23 are substantially cubical in shape and the laminae of each column member are normal to the laminae of the next adjacent column members, forming a checker board pattern (see Figure 4).

Above the columnar set 21 is a skived portion or batt 25 of glass fiber laminae, the upper face thereof being inclined downwardly to the rear, substantially parallel to the cushion top 26. A plurality of sets or batts 27, 28 and 29 are disposed above the skived portion 25. As will be apparent from an inspection of the drawings, the laminae in the batts 25—29 are all substantially parallel to those of the lower batt 20.

In assembly of cushions in accordance with this invention, adjacent faces of the individual batts, and the individual column members, are coated with a suitable adhesive, such as latex cement, whereby the batts and column members are formed into a unitary assembly.

For maximum comfort and stability, it is preferred to form the lowermost batt 20, the column members 23 and the skived portion 25 of glass fiber having a density of 2 pounds per cu. ft., the batts 27, 28 and 29 being of densities of 1½, 1 and ¾ pounds per cu. ft., respectively. It is thus evident that the sofest material is at the top of the cushion where its comfort qualities are most readily available.

It has been found that by interleaving the columnar set of glass fibers between the horizontally disposed sets, a seat cushion is produced having maximum qualities of comfort and softness, the cushion being provided with an inner core of relatively short, resilient, deflection-resistant fibres which, functioning in the manner of overload springs, prevent excessive deflection or "bottoming" of the cushion. Cushions constructed in accordance with this invention have successfully withstood severe accelerated tests. For example, cushions were subjected to hundreds of thousands of service load cycles without indication of fatigue, wear or laminae displacement. Additionally, static service loads were applied for hundreds of hours without resulting in any measurable tendency of the cushion to "creep" or take a permanent set.

It will be readily apparent to those skilled in the art that the invention is not limited to the specific arrangement or number of the sets of glass laminae shown and described above, and that the specific construction of the cushion may be varied to meet the desired requirements. Additionally, it will be obvious that the construction may be used in conjunction with foam rubber, sponge rubber and other suitable cushioning mediums.

We claim:

1. A cushion comprising a plurality of sets of laminae, the laminae of at least one set being disposed in planes substantially normal to the direction of the design load, and the laminae of another set being disposed in planes substantially parallel to the direction of the design load, said latter set comprising a plurality of substantially cubical columnar members, each member being formed of said laminae.

2. A cushion comprising a plurality of sets of laminae, the laminae of at least one set being disposed in planes substantially normal to the direction of the design load, and the laminae of another set being disposed in planes substantially parallel to the direction of the design load, said latter set comprising a plurality of substantially cubical column members, each member being formed of said laminae, the laminae of each column member being disposed in planes substantially normal to the planes of the laminae of the next adjacent column members.

3. A cushion comprising a plurality of sets of mutually parallel glass fibre laminae, the laminae of at least one set being disposed in planes substantially normal to the direction of the design load, and the laminae of another set being disposed in planes substantially parallel to the direction of the design load, said latter set comprising a plurality of substantially cubical column members, each member being formed of said laminae, the laminae of each column member being disposed in planes substantially normal to the planes of the laminae of the next adjacent column members.

4. A seat cushion having a top and bottom, said cushion comprising a plurality of sets of mutually parallel glass fibre laminae, said sets disposed one above the other, the laminae of the lowermost set being disposed in planes substantially normal to the direction of the design load, the laminae of the set immediately above and in contact with said first set being disposed in planes substantially parallel to the direction of the design load, said latter set comprising a plurality of substantially cubical column members, each member being formed of said laminae, the laminae of each column member being disposed in planes substantially normal to the planes of the laminae of the next adjacent column members, and at least one of said sets being disposed above said column members, the laminae of said last set being disposed in planes substantially normal to the direction of the design load, the density of the material of said last set being less than that of said other sets.

References Cited in the file of this patent

UNITED STATES PATENTS

| | | |
|---|---|---|
| 1,843,893 | Becher | Feb. 2, 1932 |
| 2,017,060 | Hillerich | Oct. 15, 1935 |
| 2,029,370 | Heldenbrand | Feb. 4, 1936 |
| 2,600,843 | Bush | June 17, 1952 |
| 2,621,712 | Millar et al. | Dec. 16, 1952 |
| 2,649,900 | Pfankuch | Aug. 25, 1953 |
| 2,678,686 | Schulz | May 18, 1954 |

FOREIGN PATENTS

| | | |
|---|---|---|
| 362,925 | Great Britain | Nov. 30, 1931 |
| 557,504 | Great Britain | Nov. 23, 1943 |
| 782,886 | France | Mar. 25, 1935 |